United States Patent [19]
Crawforth et al.

[11] Patent Number: 5,384,675
[45] Date of Patent: Jan. 24, 1995

[54] DISK DRIVE WITH CONTROLLED ACTUATOR OSCILLATION FOR RELEASE OF HEAD CARRIERS

[75] Inventors: Linden J. Crawforth, San Jose; John S. Foster, Morgan Hill; Jaquelin K. Spong, San Jose, all of Calif.

[73] Assignee: International Business Machines Corporation, Armonk, N.Y.

[21] Appl. No.: 118,537

[22] Filed: Sep. 8, 1993

[51] Int. Cl.⁶ ............................................. G11B 21/02
[52] U.S. Cl. ................................. 360/75; 360/97.01
[58] Field of Search ............... 360/105, 70, 75, 77.01, 360/77.02, 78.04, 78.06, 69, 97.01, 128

[56] References Cited

U.S. PATENT DOCUMENTS

| | | | |
|---|---|---|---|
| 4,530,021 | 7/1985 | Cameron | 360/97 |
| 4,589,036 | 5/1986 | Bertschy et al. | 360/75 |
| 4,970,610 | 11/1990 | Knappe | 360/75 |
| 5,018,029 | 5/1991 | Ekhoff et al. | 360/69 |

OTHER PUBLICATIONS

M. K. Hill et al., "Start/Stop Life Enhancement By Actuator Preload", IBM Technical Disclosure Bulletin, vol. 21, No. 12, May 1979, p. 4992.
S. Yamamoto, "Hard Disk Drive Spindle Motor Excitation Function", IBM Technical Disclosure Bulletin, vol. 32, No. 3B, Aug. 1989, pp. 40–41.
Anonymous, "Start Routine for Rigid Magnetic Disk Drives", Research Disclosure, No. 329, Sep. 1991.
Japan Abstract 62-71075 Suzuki Apr. 1, 1987 Detecting Mechanism For Sticking of Magnetic Head to Magnetic Disk.
Japan Abstract 1-171172 Kawamura Jul. 6, 1989 Control System For Magnetic Disk Drive.
Japan Abstract 02-81379 Akagi Mar. 22, 1990 Sticking Releasing System Between Head and Disk.

*Primary Examiner*—Andrew L. Sniezek
*Attorney, Agent, or Firm*—Thomas R. Berthold

[57] ABSTRACT

A magnetic recording disk drive has a startup routine that frees the recording head carriers and moves them to a parking location, such as load/unload ramp or a disk landing zone, if they are stuck to the disks when the drive motor is attempted to be started. If the drive motor does not achieve its operating speed at normal startup of the disk drive, thus indicating that static friction or other "stiction" forces are adhering the carriers to the disks, a series of alternating current pulses is applied to the actuator to dither the carriers at an initial frequency that is generally equal to or above the resonant frequency of the actuator system with stuck carriers. The frequency and amplitude of the pulses is swept downward from the initial frequency and amplitude and repeated until the drive motor rotates at its operating speed. The alternating current pulses that perform the dithering of the carriers have different amplitudes or durations so that a net force is applied to the actuator to move the carriers to the parking location.

28 Claims, 8 Drawing Sheets

CURRENT (Relative Units)

DISK DRIVE WITH CONTROLLED ACTUATOR OSCILLATION FOR RELEASE OF HEAD CARRIERS

TECHNICAL FIELD

This invention relates in general to data recording disk drives, and more particularly to magnetic recording rigid disk drives having means for releasing the recording head carriers from the disks when the carriers are stuck to tile disk surfaces.

BACKGROUND OF THE INVENTION

Disk drives, also called disk files, are information storage devices that use a rotatable disk with concentric data tracks containing the information, a head or transducer for reading and/or writing data onto the various tracks and an actuator connected to a carrier for the head for moving the head to the desired track and maintaining it over the track centerline during read or write operations. There are typically a plurality of disks separated by spacer rings and stacked on a hub that is rotated by a disk drive motor. A housing supports the drive motor and head actuator and surrounds the head and disk to provide a substantially sealed environment for the head-disk interface.

In conventional magnetic recording disk drives, the head carrier is an air-bearing slider that rides on a bearing of air above tile disk surface when the disk is rotating at its operational speed. The slider is maintained next to the disk surface by a relatively fragile suspension that connects the slider to the actuator. The slider is either biased toward the disk surface by a small spring force from the suspension, or is "self-loaded" to the disk surface by means of a "negative-pressure" air-bearing surface on the slider.

To improve the wear resistance of the disk, as well as to maintain consistent magnetic properties, it is desirable to make the disk surface as smooth as possible. However, a very smooth disk surface creates a problem known as "stiction". This means that after the slider has been in stationary contact with the disk for a period of time, the slider tends to resist translational movement or "stick" to the disk surface. Stiction is caused by a variety of factors, including static friction and adhesion forces between the disk and slider created by the lubricant on the disk. Stiction in a disk drive can result in damage to the head or disk when the slider suddenly breaks free from the disk surface when disk rotation is initiated. In addition, because the suspension between the actuator and the slider is relatively fragile in order to permit the slider to fly above the disk surface, sudden rotation of the disk can also damage the suspension. In some disk drives, such as low-power disk drives used in laptop and notebook computers, the drive motor may simply be unable to initiate rotation or achieve operating speed because of the adhesion forces that cause stuck sliders or excessive drag.

Contact start/stop (CSS) disk drives operate with the slider in contact with the disk surface during start and stop operations when there is insufficient disk rotational speed to maintain the air bearing. To minimize the effect of stiction, CSS disk drives often use a dedicated "landing zone" where the slider is parked when the drive is not operating. Typically, the landing zone is a specially textured nondata region of the disk. In contrast to CSS disk drives, "load/unload" disk drives address the stiction problem by mechanically unloading the slider from the disk when the power is turned off, and then loading the slider back to the disk when the disk has reached a speed sufficient to generate the air bearing. The loading and unloading is typically done by means of a ramp which contacts the suspension when the actuator is moved away from the data region of the disk. The slider is thus parked off the disk surface with the suspension supported in a recess of the ramp.

However, both CSS disk drives with landing zones and load/unload disk drives have inherent failure mechanisms that can result in the slider coming to rest on the disk. For example, external shocks can displace the slider from the landing zone or the load/unload ramp, and errors in the microcode controlling the actuator can inadvertently cause the slider to land on the disk.

The above description of the stiction problem and the operation of CSS and load/unload disk drives is not limited to the conventional air-bearing type of disk drive, but also applies to the liquid-bearing type of disk drive. In one type of liquid-bearing disk drive, as described in IBM's pending application, U.S. Ser. No. 264,604, filed Oct. 31, 1988, and published May 9, 1990, as European published application EP 367510, and in U.S. Pat. No. 5,097,368 assigned to Conner Peripherals, a relatively thick, continuously recirculating liquid film is maintained on the disk surface and the head carrier is maintained in continuous contact with the liquid film when the disk is rotating at its normal operating speed. In a variation of the liquid-bearing disk drive, as described in U.S. Pat. No. 4,901,185 assigned to Toshiba and U.S. Pat. No. 5,202,803 assigned to IBM, a combined air and liquid bearing supports the head carrier, which is in contact or partial contact with a relatively thin liquid film on the disk.

Thus, in both air-bearing and liquid-bearing disk drives, it is desirable to find a means for freeing the head carriers from the disks to which they are stuck, and for returning the carriers to their preferred parking location, i.e., the landing zone or load/unload ramp, when the stiction has been removed.

SUMMARY OF THE INVENTION

The present invention is a disk drive that includes means for oscillating (or dithering) the head carriers while simultaneously moving them radially if the carriers are stuck to the disks when the disk drive is attempted to be started. If the drive motor does not achieve its operating speed at startup of the disk drive, thus indicating that stiction is adhering the carriers to the disks, a series of alternating current pulses is applied to the actuator to dither the carriers. The pulses are applied at an initial frequency that is generally equal to or above the highest resonant frequency of the actuator system, and at an initial amplitude that will not generate a force that could damage the suspensions. The frequency and amplitude of the pulses are swept downward from the initial frequency and amplitude. This series of pulses is repeated until the drive motor is rotating at its operating speed. The positive and negative alternating current pulses that perform the dithering of the carriers also have different amplitudes or durations so that a net force is applied to the actuator to move the carriers to the parking location.

For a fuller understanding of the nature and advantages of the present invention, reference should be made to the following detailed description taken together with the accompanying drawings.

DESCRIPTION OF THE PREFERRED EMBODIMENTS

Figure 1:
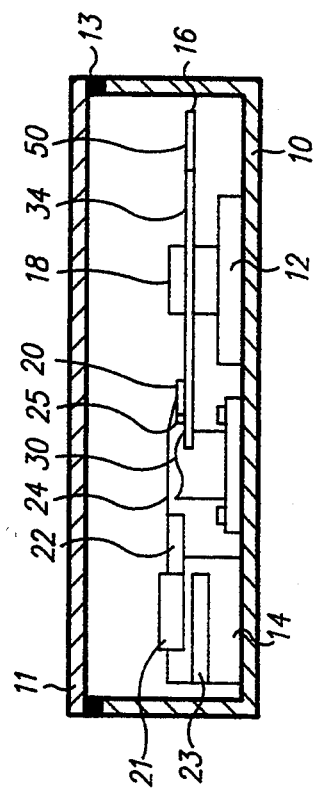
FIG. 1 is a view in section of a schematic of the disk drive of the present invention.
Figure 2:
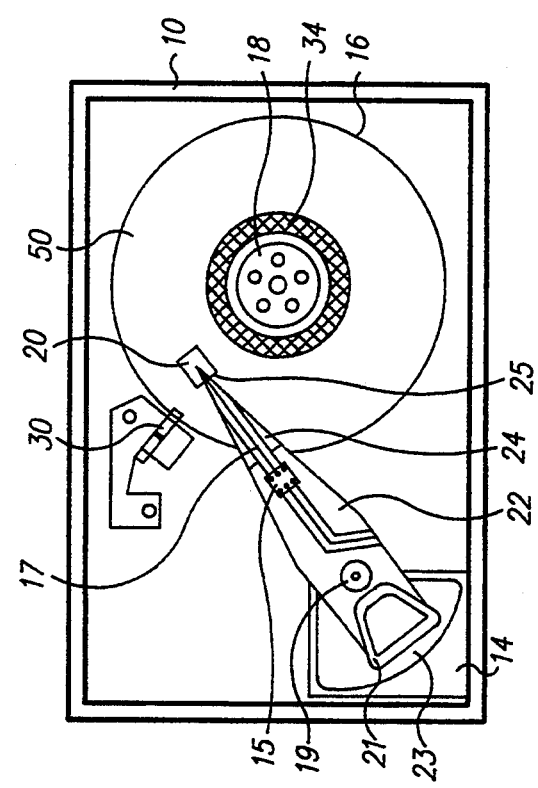
FIG. 2 is an open top view of the disk drive depicted schematically in FIG. 1.

Referring first to FIG. 1, there is illustrated in sectional view a schematic of the disk drive according to the present invention. For ease of illustration and explanation, the disk drive depicted in FIGS. 1 and 2 is shown as having a single recording head and associated disk surface, although conventional disk drives typically have multiple heads and disks. The disk drive comprises a base 10 to which are secured a disk drive or spindle motor 12 and an actuator 14, and a cover 11. The base 10 and cover 11 provide a substantially sealed housing for the disk drive. Typically, there is a gasket 13 located between base 10 and cover 11 and a small breather port (not shown) for equalizing pressure between the interior of the disk drive and the outside environment. This type of disk drive is described as being substantially sealed since the drive motor 12 is located entirely within the housing and there is no external forced air supply for cooling the interior components. A magnetic recording disk 16 is connected to drive motor 12 by means of spindle or hub 18 to which it is attached for rotation by the drive motor 12. A thin film 50 of lubricant is maintained on the surface of disk 16. The lubricant may be a conventional perfluoropolyether (PFPE) disk lubricant, such as Demnum SP brand from Daikin or Z-DOL brand from Montedison. A read/write head or transducer 25 is formed on the trailing end of an air-bearing slider 20. Transducer 25 may be an inductive read and write transducer or an inductive write transducer with a magnetoresistive (MR) read transducer formed by thin film deposition techniques as is known in the art. The slider 20 is connected to the actuator 14 by means of a rigid arm 22 and a suspension 24, the suspension 24 providing a biasing force which urges the slider 20 onto the surface of the recording disk 16. The arm 22, suspension 24, and slider 20 with transducer 25 are referred to as the head-arm assembly. During operation of the disk drive, the drive motor 12 rotates the disk 16 at a constant speed, and the actuator 14 pivots on shaft 19 to move the slider 20 generally radially across the surface of the disk 16 so that the read/write transducer 25 may access different data tracks on disk 16. The actuator 14 is typically a rotary voice coil motor (VCM) having a coil 21 that moves through the fixed magnetic field of magnet assembly 23 when current is applied to the coil.

FIG. 2 is a top view of the interior of the disk drive with the cover 11 removed, and illustrates in better detail the suspension 24 which provides a force to the slider 20 to urge it toward the disk 16. The suspension may be a conventional type of suspension such as the well-known Watrous suspension, as described in U.S. Pat. No. 4,167,765 assigned to IBM. This type of suspension also provides a gimbaled attachment of the slider which allows the slider to pitch and roll as it rides on the air bearing. The data detected from disk 16 by the transducer 25 is processed into a data readback signal by signal amplification and processing circuitry in the integrated circuit chip 15 located on arm 22. The signals from transducer 25 travel via flex cable 17 to chip 15, which sends its output signals via cable 19.

In the load/unload embodiment of the disk drive, a load/unload ramp 30 is mounted to the base 10. Ramp 30 contacts suspension 24 and lifts the slider 20 away from the disk 16 when the actuator 14 rotates the slider 20 toward the disk outside diameter when the disk drive is powered down. Examples of conventional types of load/unload ramps are described in U.S. Pat. Nos. 3,984,873 assigned to Information Storage Systems, Inc. (see FIG. 5), and 5,027,241 assigned to Quantum Corporation. In the CSS embodiment of the disk drive, the disk has a dedicated textured landing zone 34 near the disk inside diameter away from the data region.

In general, the preferred parking location for the actuator 14 when the disk drive is stopped will be its usual storage location, i.e., either with the slider 20 unloaded off the disk 16 by the ramp 30 (for a load/unload drive) or with the slider 20 in contact with the textured surface of the disk 16 at the landing zone 34 (for a CSS drive). At these locations, the slider 20 is not in contact with the smooth data region of the disk and the disk drive can be started using normal startup procedures. However, in the event the slider 20 comes to rest on the smooth data region of disk 16, the drive motor 12 may not have sufficient torque to overcome the stiction and start the drive, or the transducer 25, suspension 24, or disk 16 could become damaged if the slider 20 suddenly broke free from its stuck position.

Figure 3:
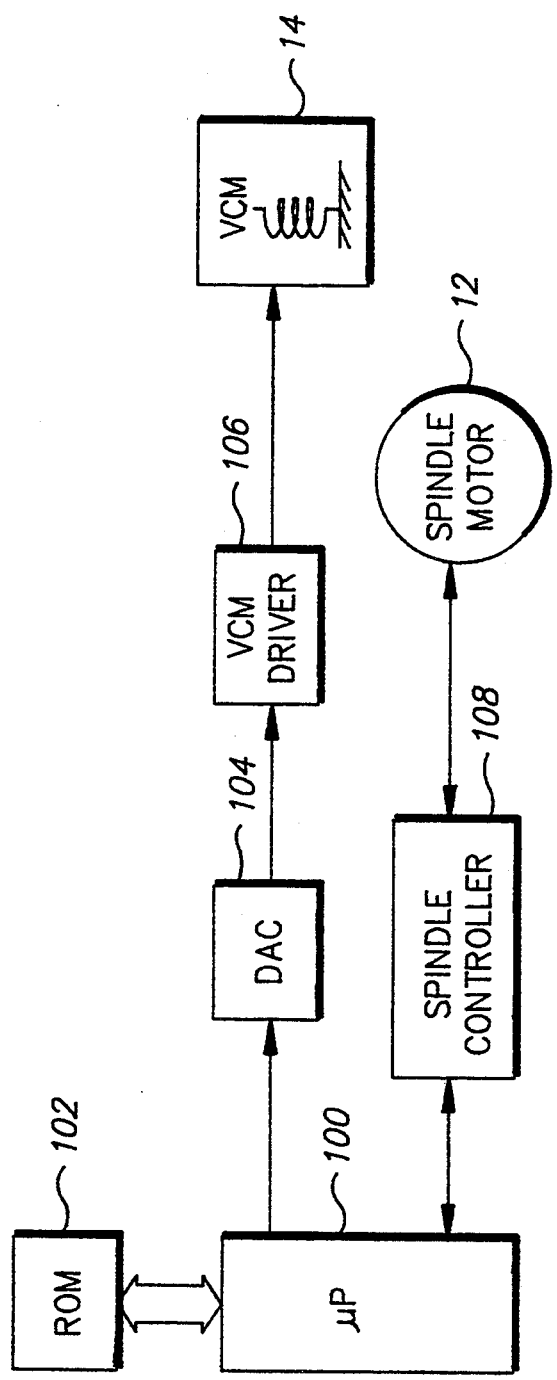
FIG. 3 is a block diagram of the microprocessor and connected drive components for performing the actuator dithering.

Referring now to FIG. 3, the drive components for oscillating the slider 20 to free it from the disk 16 and move it to a ramp or landing zone include a microprocessor 100 connected by a data bus to a data storage device, such as a read-only memory (ROM) 102, a digital-to-analog converter (DAC) 104, and a VCM driver 106 which sends current pulses to the coil of VCM 14. Microprocessor 100 also controls and is connected to the spindle motor 12 via spindle controller 108. The VCM 14 is energized by the VCM driver 106 which receives analog voltage signals from DAC 104. VCM driver 106 delivers current to the coil of VCM 14 in one direction to pivot the head-arm assembly radially outward and in the opposite direction to pivot the head-arm assembly radially inward. The spindle controller 108 controls the current to the armatures of spindle motor 12 to rotate the motor at a constant rotational speed during drive operation. In addition, the spindle controller 108 provides a status signal to microprocessor 100 indicating whether or not the spindle motor 12 is rotating at its operating speed. In the preferred embodiment, this is a signal generated from the back electromotive force (BEMF) voltage from the motor 12 which will have a nonzero value when the motor is rotating. Motor 12 is commonly a brushless DC motor with three windings or three sets of windings.

The microprocessor 100 controls the starting of the disk drive, including the procedure according to the present invention to oscillate the VCM 14 and move it to the preferred parking location if the slider 20 is stuck to disk 16. The specific pulse train from microprocessor 100 to oscillate the VCM 14 and move it radially ill response to an indication that motor 12 is not rotating is derived from data stored in ROM 102. The desired values of signal voltage, amplitude, and duration sent by microprocessor 100 to VCM driver 106, and from which the data stored in ROM 102 is derived, will be explained as follows with reference to FIGS. 4–7.

If the sliders supporting the heads land on the disks in an area other than the preferred location, which may occur, for example, if the laptop housing the disk drive is dropped, then the spindle motor may not have sufficient torque to overcome the stiction and start the drive. In this case, alternating current pulses are then applied to oscillate the actuator, resulting in a radial force large enough to free the sliders from the disks. To minimize the amount of current required to free the stuck sliders and to free them quickly as possible, the frequency with which tile alternating current is applied to the actuator is chosen to overlap with a resonant mode of vibration that exists in the actuator system. Generally, the actuator system that vibrates and thus has a resonant mode includes the coil of the VCM, the attached arms and suspensions, and the sliders, one or more of which may be stuck to its associated disk surface. The boundary conditions of this actuator system are at one end the bearings fixed to the disk drive housing and supporting the actuator, and at the other end the slider or sliders which are stuck to the disks. The actuator system has a resonant mode of vibration between these two boundaries.

Figure 4:
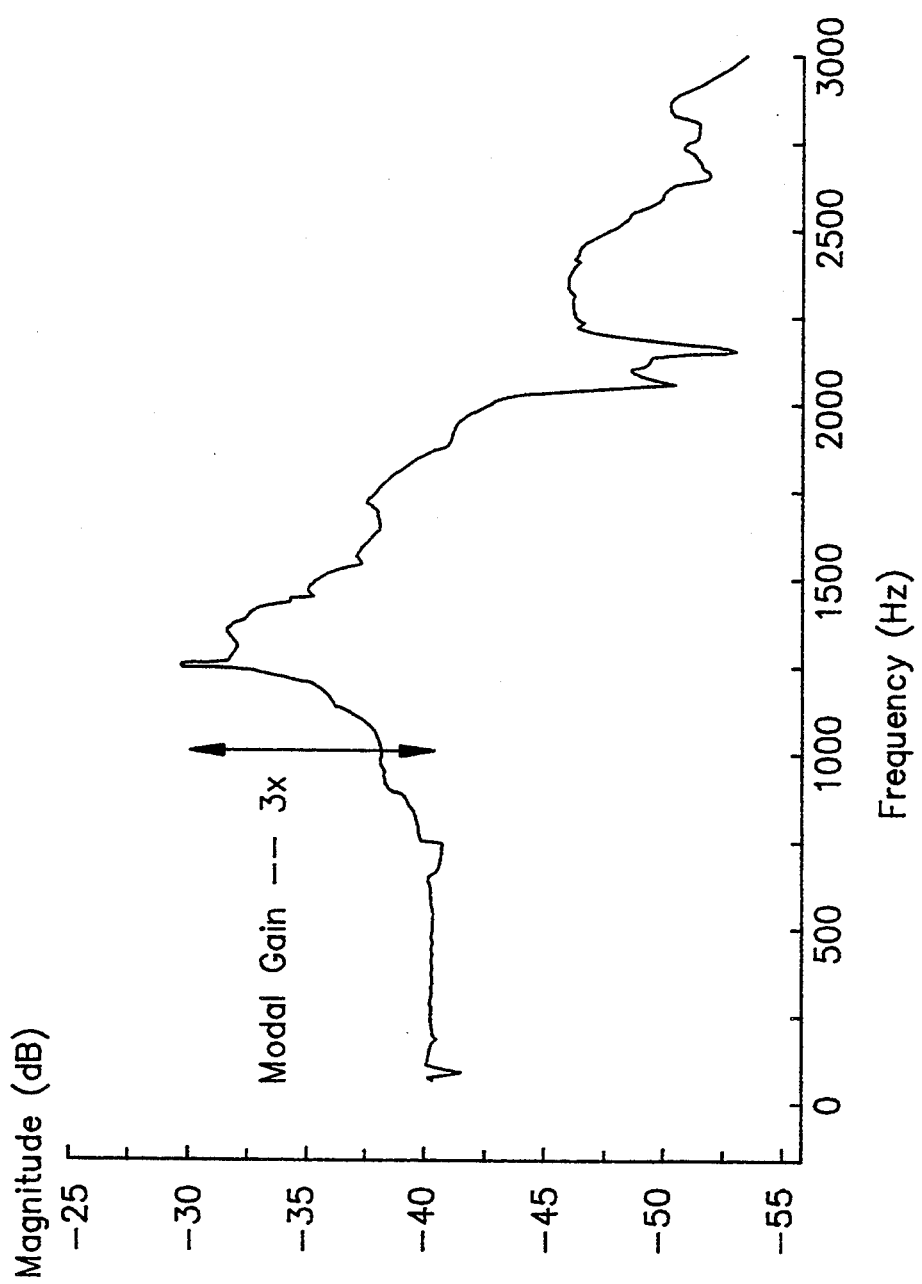
FIG. 4 is a graph of the frequency response of the actuator system when the sliders are adhered to the disks.
Figure 5:
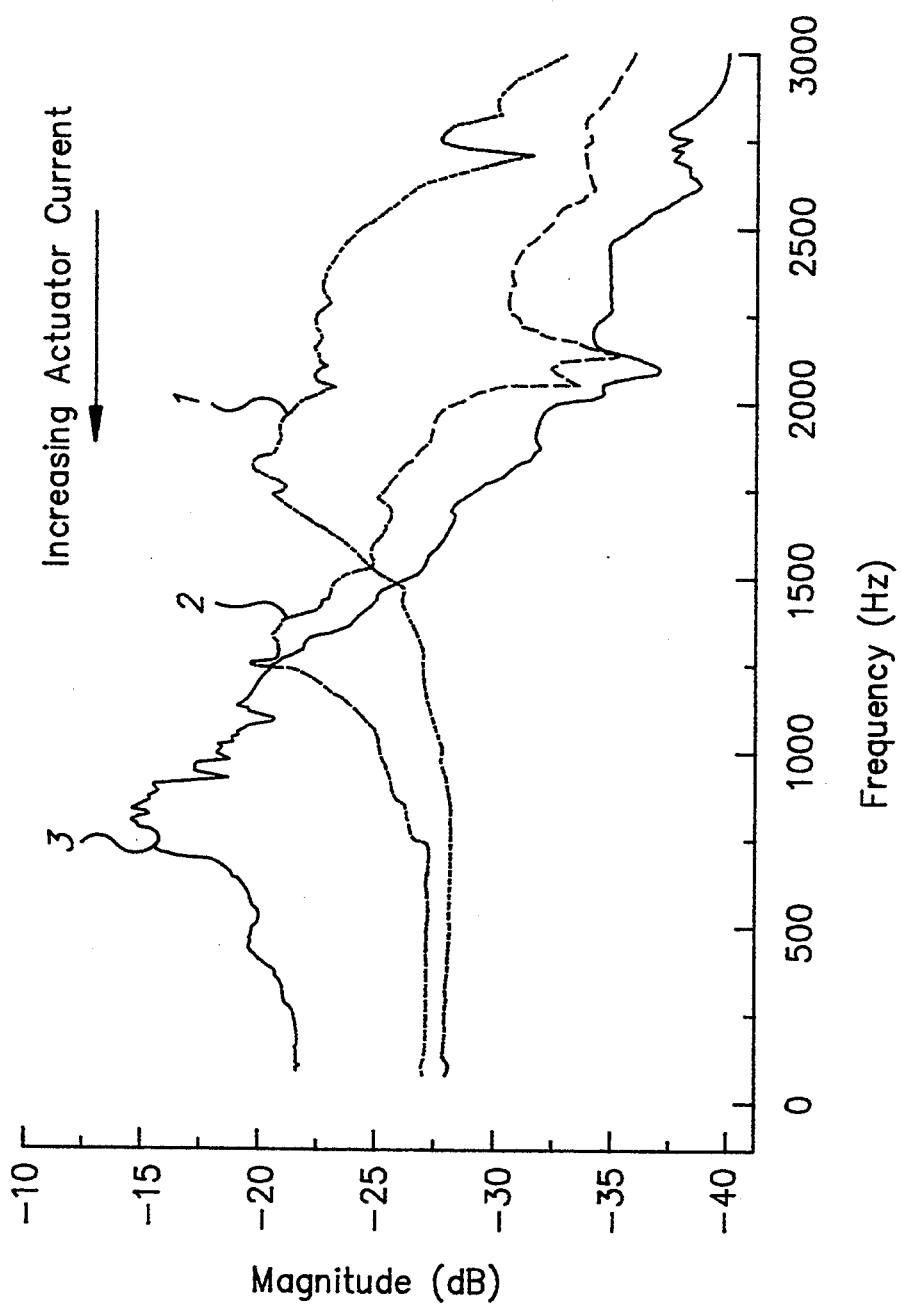
FIG. 5 shows three different frequency responses for the actuator system and illustrates the dependence of the excited actuator system resonance on the boundary conditions at the slider-disk interfaces.

FIG. 4 illustrates a frequency response function of the actuator system for the case of a 2.5-inch disk drive with four sliders adhered to two disks. From FIG. 4, it can be observed that there is a gain of approximately a factor of three in the displacement of the actuator at approximately 1250 Hz, the peak of the frequency response function. Thus, by making use of the resonant motion of the actuator system at this frequency, a reduced amount of current is required to free the sliders from the disks. Once the actuator dithering begins to overcome tile stiction, one of the boundary conditions of the resonant mode begins to change and thus the resonant frequency of vibration of the actuator system changes. In disk drives with more than one slider-disk interface, this is because some sliders break free while others remain stuck, and also because even when all sliders are free there are remaining frictional forces. This shift in the resonant frequency of the actuator system is illustrated in FIG. 5, which is an overlay of three frequency response functions of the same disk drive with varying amplitudes of alternating current supplied to the actuator. As the amplitude of the alternating current pulses is increased, from trace 1 to trace 3 in FIG. 5, the boundary condition at the slider-disk interface changes, and the resonant frequency of the vibrational mode decreases. Thus, an important feature of the present invention is the use of a repetitive, downward frequency sweep, or "chirp", of alternating current pulses which follows the resonant mode of the actuator system as it changes in frequency. This chirping of the actuator sustains a state where all sliders remain free. The sweep of frequencies can be either a continuously varying train of current pulses or a set of discrete trains of alternating current pulses with each train having a frequency less than the frequency of the previous train.

An additional feature in the present invention is that the force applied through resonant oscillation of the actuator system not exceed the yield strength of the suspensions. This is of particular importance in disk drives with multiple slider-disk interfaces. For example, in a typical disk drive the radial yield strength of a suspension is approximately 50 grams. If the total force generated by resonant oscillation of the actuator system is approximately 100 grams in a disk drive with four slider-disk interfaces, where all of the sliders are stuck, then an average force of 25 grams would be applied to each of the suspensions. This would be well below the yield strength. However, if in such a disk drive only one of the four sliders was stuck, then the full 100 grams of force could be applied to the suspension, which would permanently damage the suspension. In the present invention this situation is avoided by varying the amplitude of the alternating current pulses in the same direction tile frequency is varied so that the force applied per interface remains essentially constant. This is accomplished by applying higher levels of current at the higher frequencies, and lower levels of current at the lower frequencies. Thus, for example, in a disk drive with four slider-disk interfaces where only one slider is stuck, the yield strength of the suspension will not be reached because the resonant frequency of the actuator system with one stuck slider is at a low frequency where the low amplitude current pulses are being generated. The high amplitude portion of the pulse train does not result in large applied forces because it occurs at a high frequency, away from the resonant frequency of the actuator system with one stuck slider. This implementation has the advantage that essentially a constant force per interface is being generated. The result is that the forces applied are high enough to overcome the case where all sliders are stuck (the actuator system with a high resonant frequency), yet do not cause suspension damage in the case where only a single slider is stuck (the actuator system with a low resonant frequency).

Figure 6:
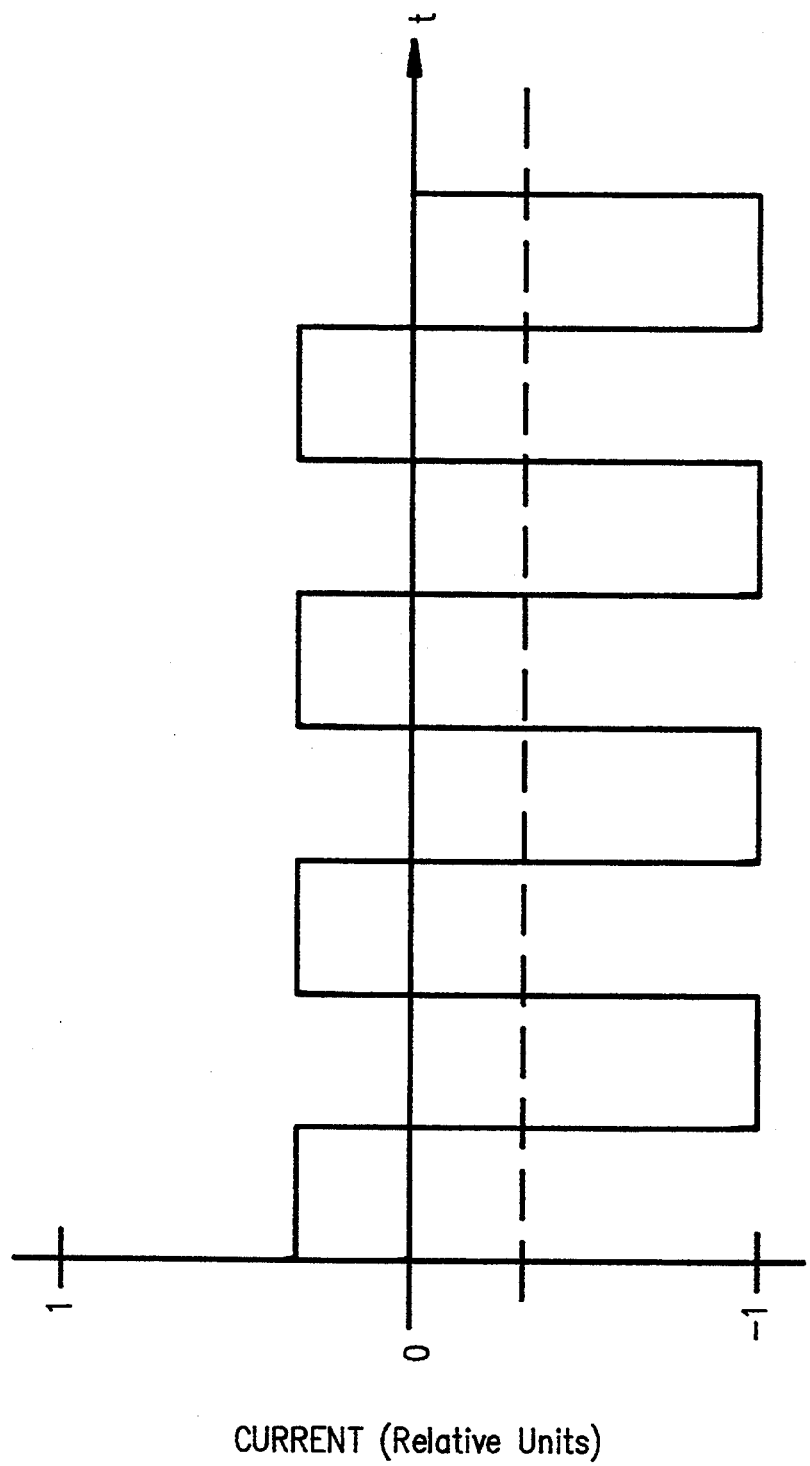
FIG. 6 is a graph of a portion of an alternating current pulse train to the actuator illustrating different current amplitudes for positive and negative current directions.

An important feature of the present invention is that the train of alternating current pulses is selected so that they also apply a net force in one of the radial directions to drive the actuator to the preferred parking location for the head carrier. In a VCM, the force applied to rotate the actuator is directly proportional to the amount of current applied, and the actuator will continue to accelerate for the duration of the current pulse. Thus, alternating current pulses of the same amplitude and duration will exactly cancel so that there is no net actuator movement. Referring to FIG. 6, a simple implementation to apply a net force to the actuator is a symmetric train of current pulses that are offset by the addition of a DC component shown by the dashed line.

Figure 7:
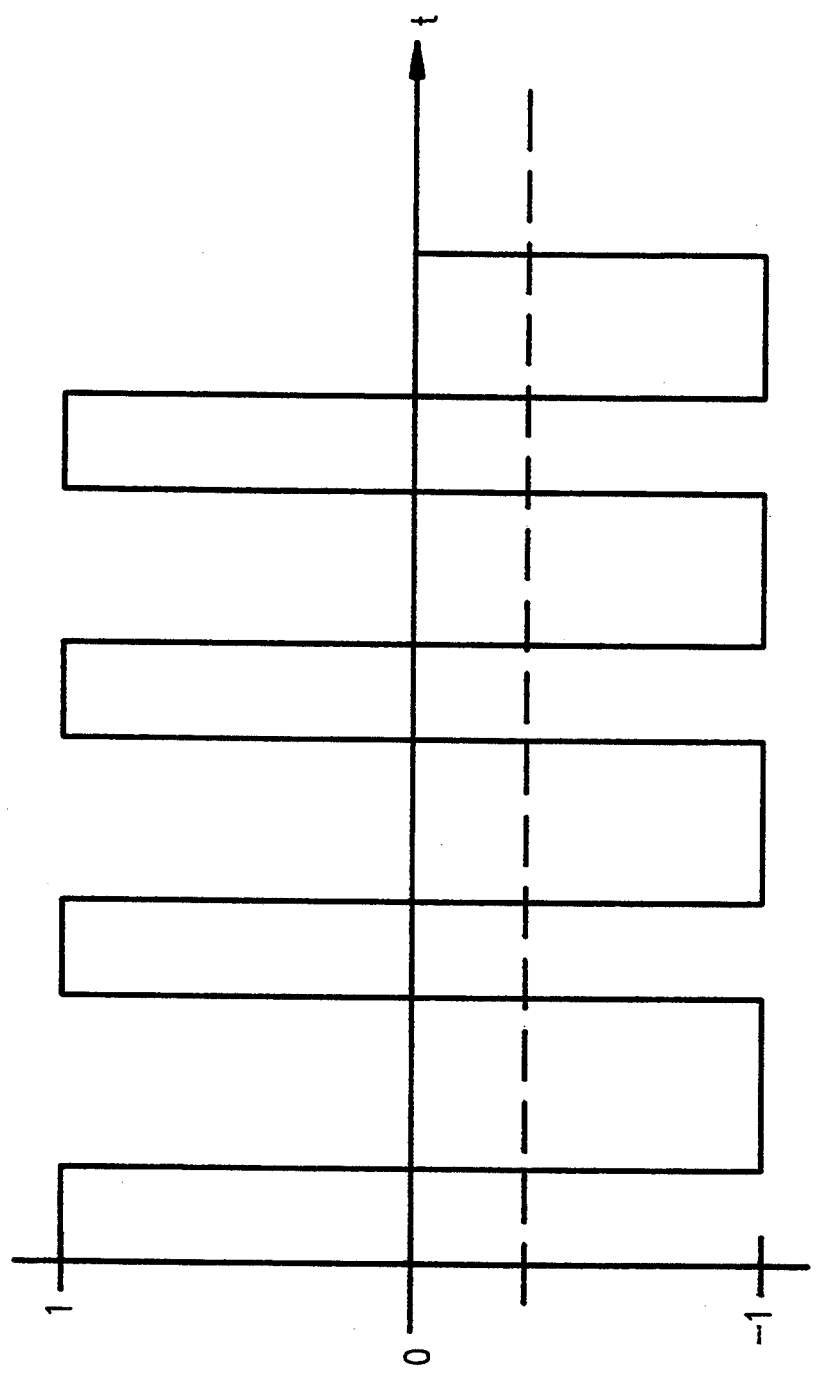
FIG. 7 is a graph of a portion of an alternating current pulse train to the actuator illustrating the same current amplitudes, but different pulse widths, for positive and negative current directions.

As shown, the current pulses in the positive and negative directions are of the same duration, but the current amplitude in the negative direction is greater than in the positive direction. The result is that the actuator will be trying to move the sliders radially at the same time the alternating current pulses are oscillating the sliders to free them from the disks. The preferred implementation of this feature is shown in FIG. 7. In this case, a nonsymmetric square wave, having the same effective DC offset (shown by the dashed line) as the case for FIG. 6, is applied to the actuator. The current amplitudes are the same in the positive and negative directions, but the negative pulses have a greater duration than the positive pulses. The advantage of the embodiment of FIG. 7 is that it uses the full range of AC voltage available in the disk drive, which is typically 3 or 5 volts. This is especially important for voltage-constrained systems, such as drives designed for notebook computers, in that the full voltage range can be used to generate the oscillation and free tile sliders from the disks, while retaining a DC component to drive the actuator to the preferred parking location. The alternative of switching to DC excitation of tile actuator after the AC excitation has freed tile sliders has the inherent disadvantage that the sliders can become immediately stuck again to the disks once tile AC excitation is removed.

Figure 8:
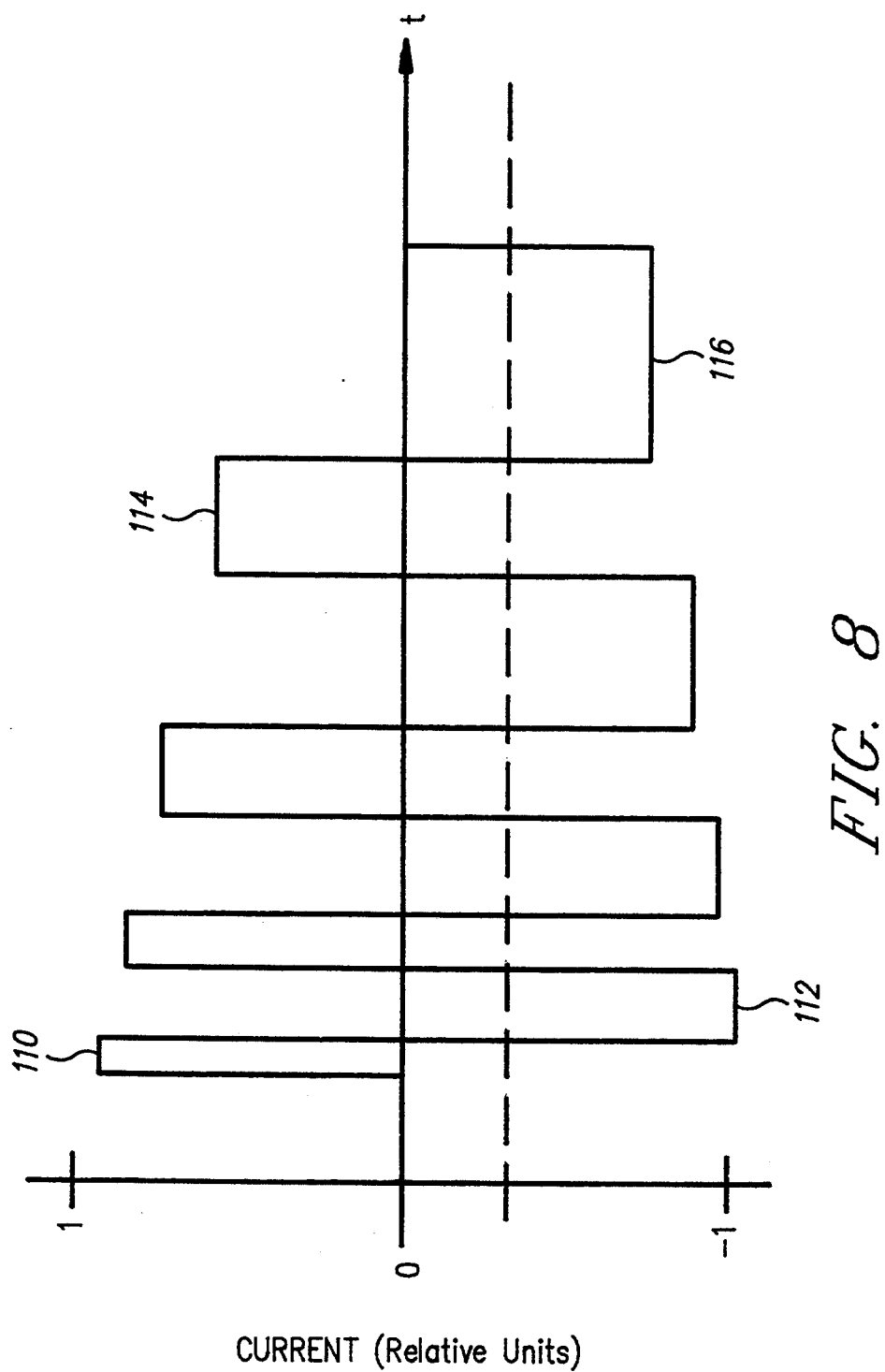
FIG. 8 is a graph of the preferred alternating current pulse train to the actuator to simultaneously dither and move the sliders, and illustrates the frequency sweep, the amplitude sweep, and the different positive and negative pulse widths.

The preferred signal applied to the actuator can now be understood with reference to FIG. 8. FIG. 8 illustrates the pulse train with frequency and amplitude variation, and with the nonsymmetrical duration of positive and negative current pulses to produce an effective DC offset and thus a net radial movement of the actuator. As shown, the initial positive pulse 110 and initial negative pulse 112 are applied at an initial frequency and with the same amplitude, but with the duration of the negative pulse 112 being longer than positive pulse 110. At a later time, the positive pulse 114 and negative pulse 116 have a lower frequency and amplitude than the initial frequency and amplitudes of pulses 110, 112, but tile amplitudes of pulses 114, 116 remain identical. In the preferred embodiment, the frequency and amplitude decrease linearly from tile beginning to the end of the pulse train. In the previously described example of a 2.5-inch disk drive with four head carriers and two disks (four disk surfaces), and having an actuator system resonant mode of 1250 Hz with all four carriers stuck, a single pulse train lasted 150 ms and had an amplitude decreasing linearly from an initial value of 350 milliamps to 90 milliamps, and a frequency decreasing linearly from an initial value of 1600 Hz to 600 Hz.

The measured resonant frequency of the actuator system for a specific disk drive is stored in ROM 102 (FIG. 3) to be accessed by microprocessor 100 and used to generate the voltage pulses to VCM driver 106, which then outputs corresponding current pulses to the coil of VCM 14. The data in ROM 102 represents the desired frequency range of the pulses for the chirp (or sets of discrete frequencies if the chirp is a set of discrete pulse trains ), and the amplitude and duration of the pulses. It is also possible, as is well known in the art of microprocessor operation, to incorporate values representing this data as part of the microcode which the microprocessor 100 executes.

Figure 9:
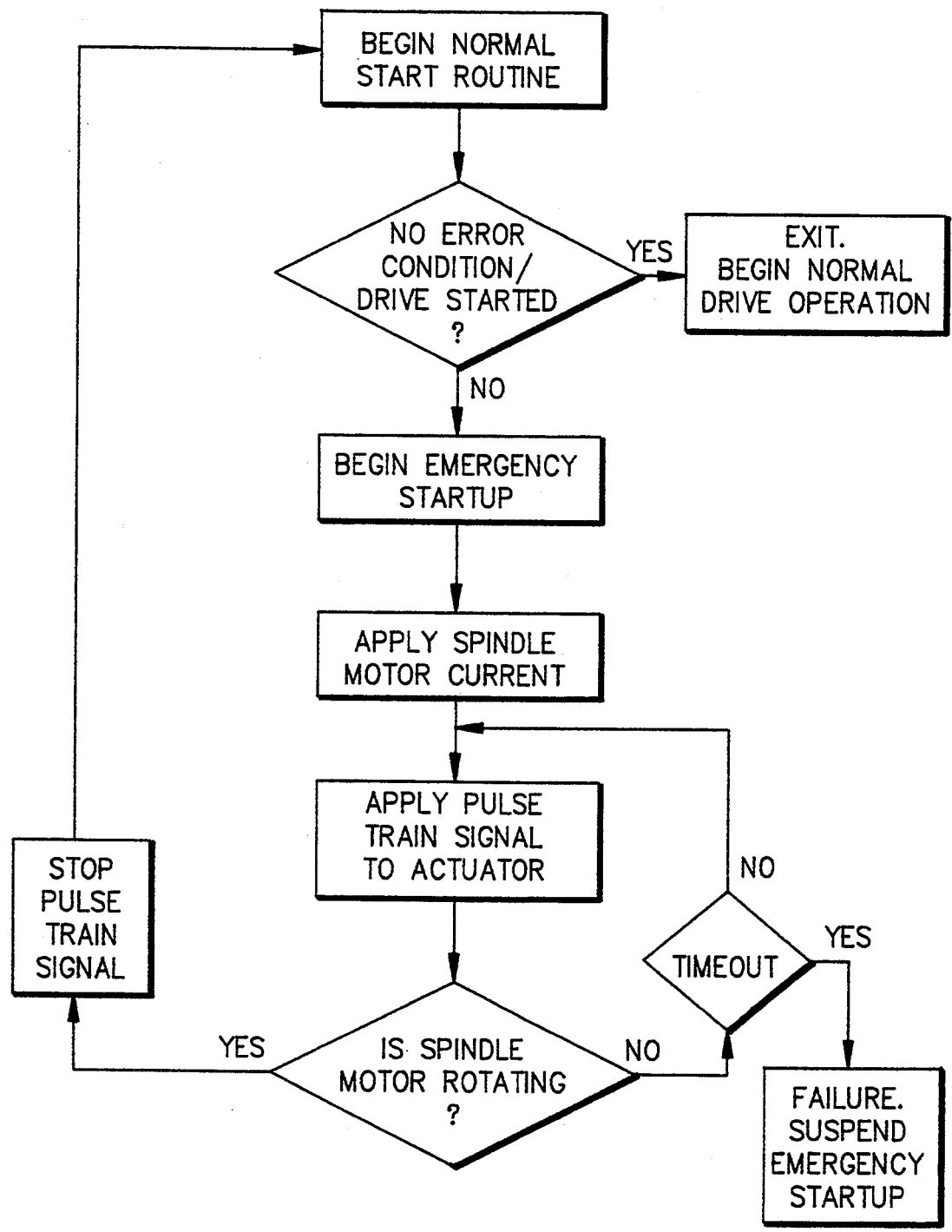
FIG. 9 is a flow chart depicting the sequential operation of the disk drive to apply the actuator dithering and radial movement in the event the sliders are stuck to the disks.

The implementation of the preferred embodiment of the invention is shown in the flow chart of FIG. 9. The first step is the normal disk drive start routine. Next, the microprocessor queries the disk controller's status registers to determine whether an error condition indicates that the drive is not operating properly, such as failure of the spindle motor to start. These conditions may include, for example, a head-positioning servo signal not found, a data sector/cylinder identification not found, spindle motor BEMF too low, or power dissipation too high. Upon the detection of an error condition indicating that the drive has not started, the microprocessor initiates the emergency startup procedure. Current is applied to the spindle motor to start rotation of the disks. The microprocessor then sends the nonsymmetric pulse train (as described with respect to FIG. 8) to the actuator to attempt to release the sliders and drive the actuator toward the preferred parking location. This signal is continuously cycled, i.e., the same pulse train with decreasing amplitude and frequency is reapplied so that the actuator continues to dither the sliders while also attempting to move them across the disks. This condition, with the spindle motor energized and the actuator simultaneously dithering and radially moving the sliders, continues until the microprocessor detects that the spindle motor is rotating at its operating speed, or until a predetermined timeout is reached. If the spindle motor is rotating at its operating speed, the microprocessor stops the signal and returns to the first step to begin the normal startup routine. A timeout indicates that some other failure has occurred, and the emergency procedure is suspended. The microprocessor will continue to reapply the signal during movement of tile sliders to their parking location because the spindle motor will not generally be able to achieve operating speed until the carriers are unloaded from the disk or are over the textured landing zone.

While the preferred embodiments of the present invention have been illustrated in detail, it should be apparent that modifications and improvements may be made to the invention without departing from the spirit and scope of the invention as described in the following claims.

What is claimed is:

1. A data recording disk drive comprising:
   at least one data disk;
   a motor spindle connected to the disk for rotating the disk;
   a transducer for writing data to or reading data from the disk;
   a carrier supporting the transducer;
   a voice coil motor actuator connected to the carrier for moving the carrier generally radially across the disk so the transducer may access different regions of data on the disk;
   means coupled to the coil of the voice coil motor actuator for applying a train of alternating positive and negative current pulses to the coil of the voice coil motor to oscillate the carrier radially in and out, the positive current pulses having a pulse duration or an amplitude different from the pulse duration or amplitude, respectively, of the negative current pulses to simultaneously move the oscillating carrier in a net radial direction across the disk when the disk is not rotating at its operating speed; and
   means for supporting the spindle motor and voice coil motor actuator.

2. The disk drive according to claim 1 further comprising means coupled to the pulse train application means for sensing when the disk is rotating at its operating speed, and means responsive to the sensing means for terminating oscillation of the carrier.

3. The disk drive according to claim 1 further comprising means attached to the spindle motor and voice coil motor actuator supporting means for unloading the carrier from the disk when the disk drive is not operating, and wherein the train of alternating current pulses causes the carrier to move generally radially across the disk to the unloading means.

4. The disk drive according to claim 1 further comprising a carrier landing zone located on the disk, and wherein the train of alternating current pulses causes the carrier to move across the disk to the landing zone.

5. The disk drive according to claim 1 wherein the carrier is an air-bearing slider.

6. The disk drive according to claim 1 wherein the disk has a continuous liquid film on its surface and further comprising means for maintaining the carrier generally in contact with the liquid film when the disk is rotating at its operating speed.

7. The disk drive according to claim 1 wherein the pulse train application means comprises means for applying the pulses at a frequency that varies with time.

8. The disk drive according to claim 7 wherein the means for applying the pulses at a varying frequency comprises means for decreasing the frequency from an initial frequency.

9. The disk drive according to claim 8 wherein the actuator has a resonant frequency when the carrier is stuck to the disk, and wherein the initial frequency is equal to or higher than said actuator resonant frequency.

10. The disk drive according to claim 1 wherein the pulse train application means comprises means for applying the pulses at an amplitude that varies with time.

11. A magnetic recording disk drive comprising:
a magnetic recording disk having a region for the recording of data;
a spindle motor connected to the disk for rotating the disk;
a transducer for writing data to or reading data from the disk;
a carrier for supporting the transducer;
a voice coil motor (VCM) actuator for moving the carrier generally radially across the disk;
a suspension connecting the carrier to the actuator for maintaining the carrier near the surface of the disk when the disk is rotating at its operating speed;
means for parking the carrier when the disk is not rotating at its operating speed; and
means responsive to an error condition indicating that the spindle motor has not started for applying a train of alternating positive and negative current pulses to the coil of the voice coil motor to oscillate the carrier radially in and out, the positive current pulses having a pulse duration or an amplitude different from the pulse duration or amplitude, respectively, of the negative current pulses to simultaneously move the oscillating carrier across the disk toward the parking means.

12. The disk drive according to claim 11 wherein the carrier parking means comprises means for supporting the carrier away from the disk.

13. The disk drive according to claim 11 wherein the carrier parking means comprises a carrier landing zone located on the disk.

14. The disk drive according to claim 11 wherein the carrier is an air-bearing slider.

15. The disk drive according to claim 11 wherein the disk has a continuous liquid film on its surface, and wherein the suspension comprises means for maintaining the carrier generally in contact with the liquid film when the disk is rotating.

16. The disk drive according to claim 11 wherein the pulse train application means comprises means for applying the pulses at a frequency that varies with time.

17. The disk drive according to claim 16 wherein the means for applying tile pulses at a varying frequency comprises means for decreasing the frequency from an initial frequency.

18. The disk drive according to claim 17 further comprising a rigid arm connecting the coil of the VCM to the suspension and wherein the coil of the VCM with attached arm and suspension has a resonant frequency when the carrier is stuck to the disk, and wherein said initial frequency is equal to or higher than said resonant frequency.

19. The disk drive according to claim 11 wherein the pulse train application means comprises means for applying the pulses at an amplitude that varies with time.

20. The disk drive according to claim 11 wherein the pulse train application means comprises means for applying the pulses at a frequency and amplitude that decrease with time.

21. A magnetic recording disk drive comprising:
a plurality of magnetic recording disks, each disk having at least one disk surface having a region for the recording of data;
a spindle motor connected to the disks for rotating the disks;
means for generating an error condition signal when the spindle motor is not rotating at its operating speed after power bas been applied to the spindle motor;
a plurality of transducers for writing data to or reading data from the disks;
a plurality of carriers, each carrier supporting at least one transducer;
a voice coil motor (VCM) rotary actuator for moving the carriers generally radially across their associated disk surfaces;
a plurality of suspensions, each suspension connected to an associated carrier, for maintaining the carriers near the surfaces of their associated disks when the disks are rotating at their operating speed;
at least one rigid arm connecting the coil of the VCM to the suspensions, the system of the coil-arm-suspension carriers having a resonant frequency when all of the carriers are stuck to their associated disk surfaces;
means for parking the carriers when the disks are not rotating at their operating speed; and
means responsive to the error condition signal for applying a train of alternating current pulses to the coil of the VCM to oscillate the carriers radially in and out and simultaneously move them in a net radial direction across the disks toward the parking means, the pulse train application means including means for applying the pulses at a decreasing frequency commencing with an initial frequency equal to or greater than said resonant frequency.

22. The disk drive according to claim 21 wherein the carrier parking means comprises means for supporting the carriers away from their associated disk surfaces.

23. The disk drive according to claim 21 wherein the carrier parking means comprises a carrier landing zone located on each of the associated disk surfaces away from the data region on each of said disk surfaces.

24. The disk drive according to claim 21 wherein the carriers are air-bearing sliders.

25. The disk drive according to claim 21 wherein each of the disk surfaces has a continuous liquid film, and wherein each of the suspensions comprises means for maintaining its associated carrier generally in contact with the liquid film on its associated disk surface when the disks are rotating at their operating speed.

26. The disk drive according to claim 21 wherein the pulse train application means to move the carriers simultaneously with their oscillation includes means for applying the pulses with a current amplitude that decreases with time.

27. The disk drive according to claim 21 wherein the pulse train application means to move the carriers simultaneously with their oscillation includes means for applying positive current pulses at a different amplitude than negative current pulses, whereby a net force is applied to the coil to move the connected carriers in a generally radial direction across the disks.

28. The disk drive according to claim 21 wherein the pulse train application means to move the carriers simultaneously with their oscillation includes means for applying positive current pulses with a fixed-pulse duration and negative current pulses of the same amplitude as the positive current pulses and with a fixed-pulse duration different than the duration the positive current pulses, whereby a net force is applied to the coil to move the connected carriers in a generally radial direction across the disks.

* * * * *

UNITED STATES PATENT AND TRADEMARK OFFICE
CERTIFICATE OF CORRECTION

PATENT NO.   :   5,384,675
DATED        :   January 24, 1995
INVENTOR(S)  :   Linden J. Crawforth et al.

It is certified that error appears in the above-identified patent and that said Letters Patent is hereby corrected as shown below:

Col. 4, line 38, "tile" should read "the".

Col. 5, line 19, "ill" should read "in".
        line 36, "tile" should read "the".
        line 58, "tile" should read "the".

Col. 6, line 34, "tile" should read "the".

Col. 7, line 20, "tile" should read "the".
        line 23, "tile" should read "the".

Claim 1, col. 8, line 42, "a motor spindle" should read "a spindle motor".

Claim 17, col. 10, line 8, "tile" should read "the".

Signed and Sealed this

Tenth Day of October, 1995

Attest:

BRUCE LEHMAN

Attesting Officer

Commissioner of Patents and Trademarks